United States Patent [19]

Ohashi et al.

[11] Patent Number: 5,023,530
[45] Date of Patent: Jun. 11, 1991

[54] WINDSHIELD WIPER MOTOR

[75] Inventors: Yasuo Ohashi; Masao Irie, both of Yokohama, Japan

[73] Assignee: Jidosha Denki Kogyo K.K., Kanagawa, Japan

[21] Appl. No.: 523,960

[22] Filed: May 15, 1990

[30] Foreign Application Priority Data

May 16, 1989 [JP] Japan .................. 1-56302[U]

[51] Int. Cl.⁵ .................. B60S 1/08; H01H 19/20
[52] U.S. Cl. .................. 318/446; 318/443; 318/DIG. 2; 200/11 G
[58] Field of Search .............. 318/443, 444, 445, 446, 318/DIG. 2; 200/11 R, 11 G, 19 R; 15/250 C, 250.12, 250.16, 250.17

[56] References Cited

U.S. PATENT DOCUMENTS

| | | | |
|---|---|---|---|
| 3,253,206 | 5/1966 | Romanowski | 318/466 |
| 4,259,624 | 3/1981 | Seibicke | 318/443 X |
| 4,350,938 | 9/1982 | Ecole | 318/443 |
| 4,455,511 | 6/1984 | Stewart, Sr. | 318/443 X |
| 4,559,484 | 12/1985 | Hirano | 318/443 |
| 4,609,794 | 9/1986 | Porter | 200/24 |
| 4,613,733 | 9/1986 | Migrin et al. | 15/250.12 X |
| 4,673,853 | 6/1987 | Tsunoda et al. | 318/443 |
| 4,700,026 | 10/1987 | Kamiyama et al. | 200/19 R |

Primary Examiner—Bentsu Ro
Attorney, Agent, or Firm—Sughrue, Mion, Zinn, Macpeak & Seas

[57] ABSTRACT

A windshield wiper motor is provided with an auto-stopping switch having a first contact plate, a second contact plate, a third contact plate and a contact shoe for contacting with said third contact plate at all times and for contacting selectively with said first or second contact plate by sliding reciprocatively on a straight line in accordance with rotation of the final gear of reduction gear. It is possible to prevent the auto-stopping switch from chattering caused by snow gathered in the vicinity of a stopping position of a wiper blade in snowfall.

2 Claims, 7 Drawing Sheets

WINDSHIELD WIPER MOTOR

BACKGROUND OF THE INVENTION

1. Field Of The Invention

This invention relates to a windshield wiper motor used for driving a wiper linkage to wipe rain drops and the like on a windshield surface.

2. Description Of The Prior Art

Heretofore, there has been used a windshield wiper motor incorporated with, for example, an auto-stopping mechanism as shown in FIG. 8.

A windshield wiper motor 101 shown in FIG. 8 is equipped with an armature 102 and reduction gear 103 for reducing rotational speed of said armature 102, and equipped with an auto-stopping switch 105 for stopping a wiper blade A shown in FIG. 7 at a stopping position securely to a worm wheel that is the final gear of said reduction gear 103.

Said auto-stopping switch 105 is disposed with a circular first contact plate 110 cut off in fan-like shape at a part thereof and a second contact plate 111 positioned in the cutout portion of said first contact plate 110, separated from said first contact plate 110 and jutting out from the outer periphery of said first contact plate 110 on one side of said worm wheel, and is equipped with a first contact 113 connected to a power source 112 and an armature 102 and possible to contact only with said second contact plate 111 and a second contact 115 connected to an OFF-terminal 114a of a wiper switch 114 and possible to contact with both said first and second contact plates 110 and 111. And said first contact plate 110 is grounded, a high-speed terminal of the windshield wiper motor 101 is connected to a high-speed terminal 114c of the wiper switch 114 and a low-speed terminal of the windshield wiper motor 101 is connected to a low-speed terminal 114d of the wiper switch 114.

Moving a movable contact 114b of said wiper switch 114 to the OFF-terminal 114a from the high-speed terminal 114c or the low-speed terminal 114d, the wiper blade A is driven in the vicinity of the stopping position by continuing the power supply to the armature 102 because the second contact 115 of the auto-stopping switch 105 is in contact with the first contact plate 110 and grounded when the wiper blade A is not sited at the stopping position shown with a solid line in FIG. 7. And the power supply to the motor is cut off when the second contact 115 separetes from the first contact plate 110, however the wiper blade A is further moved by the inertial force. When said wiper blade A reaches in the stopping position, the first and second contacts 113 and 115 are in contact with the second contact plate 111 of the auto-stopping switch 105 and the wiper blade A is stopped immediately at the stopping position by braking the armature 102 dynamically.

However, in the aforementioned conventional windshield wiper motor 101, when the wiper switch 114 is changed into OFF-operation in order to stop the wiper blade A at the stopping position in a state in which snow stands in the vicinity of the stopping position by wiping snow with the wiper blade A in snowfall, the wiper blade A hits against the snow gathered in the vicinity of said stopping position of the wiper blade A and returns in the opposite direction as a reaction from the gathered snow. The position in which the wiper blade A hits against the gathered snow corresponds to a position in which the second contact 115 of the auto-stopping switch 105 is switched over from the contact with the first contact plate 110 to the contact with the second contact plate 111, said second contact 115 is in contact with a space between the first and second contact plates 110 and 111 and the armature 102 is in a state the power supply is cut off. Accordingly, the second contact 115 touches again the first contact plate 110 by the reaction from the gathered snow and the armature 102 is supplied with electric power, and a phenomenon that the wiper blade A hits repeatedly against the snow by the rotation of said armature 102 and the reaction from the snow, that is, chattering occures. Thereby the second contact 115 of the auto-stopping switch 105 sparks every time it touches the first contact plate 110 and the resinous worm wheel is deformed partially owing to the heat caused by sparking, there is a problem since the working of the windshield wiper motor 101 may be hindered by the deformation of the worm wheel.

SUMMARY OF THE INVENTION

Therefore, an object of the invention is to provide a windshield wiper motor which is possible to prevent a auto-stopping switch from the chattering phenomenon even if a wiper blade is returned as a reaction form snow gathered in the vicinity of the stopping position of said wiper blade in snowfall.

The windshield wiper motor according to claim 1 of this invention comprises an electric motor part, a gear case connected with said motor part and housing reduction gear for reducing rotational speed of an armature of said motor part and an auto-stopping switch provided to said gear case and for driving an output shaft of said reduction gear to a fixed stopping position and stopping the armature of said motor part at said stopping position by dynamic braking according to OFF-operation of a wiper switch, and is characterized by having a construction that said auto-stopping switch is provided with a first contact plate connected to a grounding conductor, a second contact plate connected to a power source and a third contact plate connected to a line terminal of the motor part on the inner surface of a gear cover, and provided with a contact shoe for contacting with said third contact plate at all times and for contacting with said first or second contact plate selectively by sliding on a straight line reciprocatively in accordance with rotation of the final gear of said reduction gear. And the aforementioned construction of the windshield wiper motor is taken as a measure to solve the aforementioned problem of the prior art.

Further, the windshield wiper motor according to claim 2 of this invention is characterized by having a construction that said contact shoe is provided with a first protrusion for sliding said contact shoe into predetermined direction on a guide groove in contact with a C-like shaped first projection disposed on the final gear of said reduction gear, a second protrusion for sliding said contact shoe into another side on the guide groove in contact with a second projection disposed on the inner side of said first projection, a first contact for contacting selectively with the first or second contact plate, and a second contact for contacting with the third contact plate at all times in the windshield wiper motor according to claim 1. And the aforementioned construction of the windshield wiper motor is taken as a measure to solve the aforementioned problem of the prior art.

The windshield wiper motor according to claim 1 of this invention is so constructed as to slide the contact shoe of the auto-stopping switch on the straight line reciprocatively in accordance with the rotation of the final gear of the reduction gear. Therefore, the first contact plate is connected electrically with the third contact plate when said contact shoe is in contact with the first contact plate, and the wiper blade is driven to the fixed stopping position by continuing the power supply to the armature. And the second contact plate is connected electrically with the third contact plate when said contact shoe is in contact with the second contact plate, and the wiper blade is stopped at the stopping position by braking the armature dynamically.

The windshield wiper motor according to claim 2 of this invention is so constructed as to slide said contact shoe into predetermined direction on a guide groove by contacting the first protrusion of the contact shoe with the C-shaped projection disposed on the final gear of the reduction gear and to slide said contact shoe into another side on the guide groove by contacting the second protrusion of the contact shoe with the second projection on the final gear of the reduction gear. Therefore, the contacting period of the first contact plate with the third contact plate and the contacting periode of the second contact plate with the third contact plate are controlled by adjusting the lengths of the first and second projections in the circumferential direction. And because the first and second projections on the final gear slide the contact shoe on the guide groove reciprocatively by contacting with the first and second protrusions of said contact shoe in the circumferential direction, said contact shoe is never slided in the opposite direction even if the final gear rotates in the opposite direction in some measure.

DESCRIPTION OF THE PREFERRED EMBODIMENT

This invention will be described below on basis of drawings.

Figure 1:
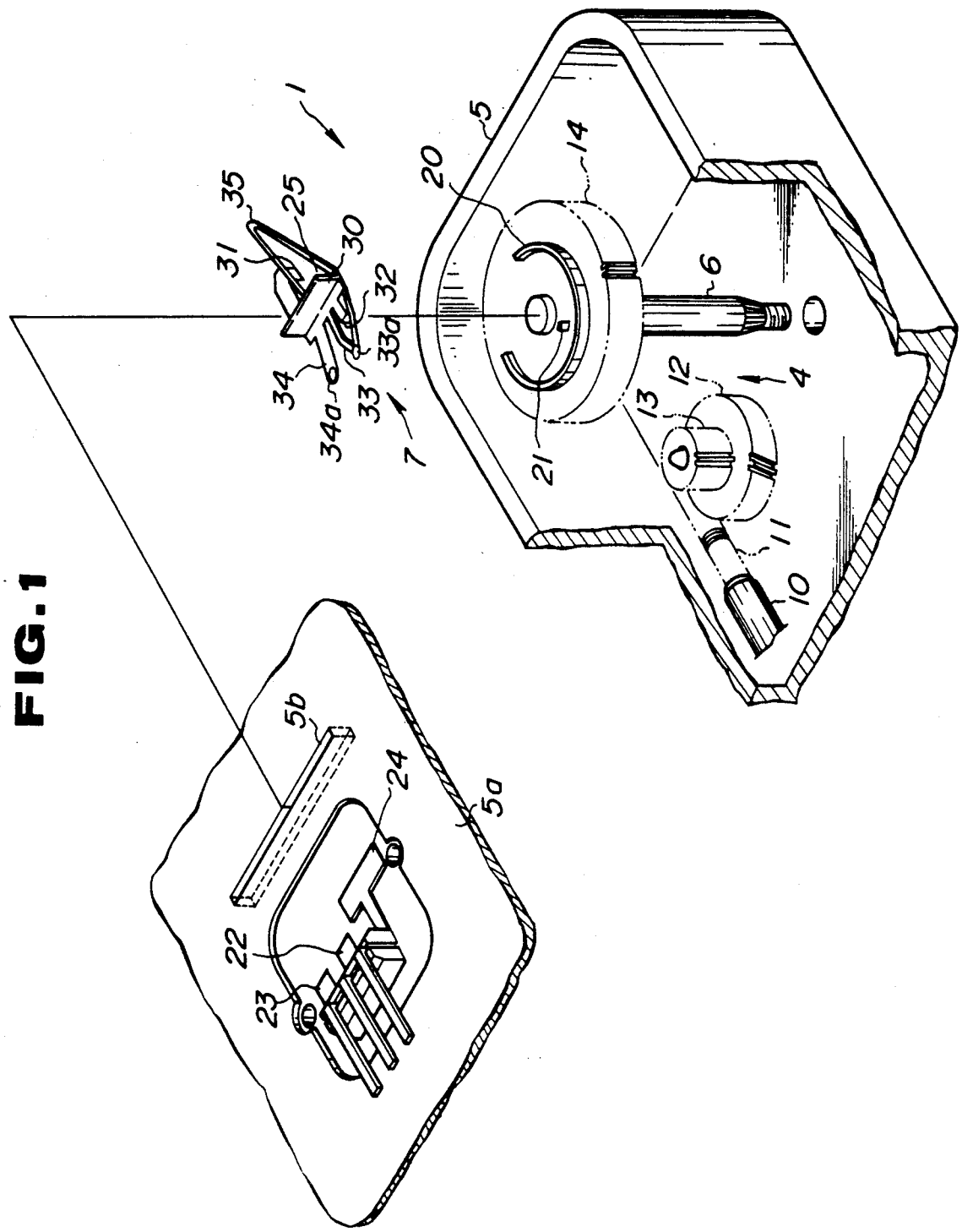
FIG. 1 is an exploded perspective view illustrating the auto-stopping switch in an embodiment of the windshield wiper motor according to this invention.
Figure 2:
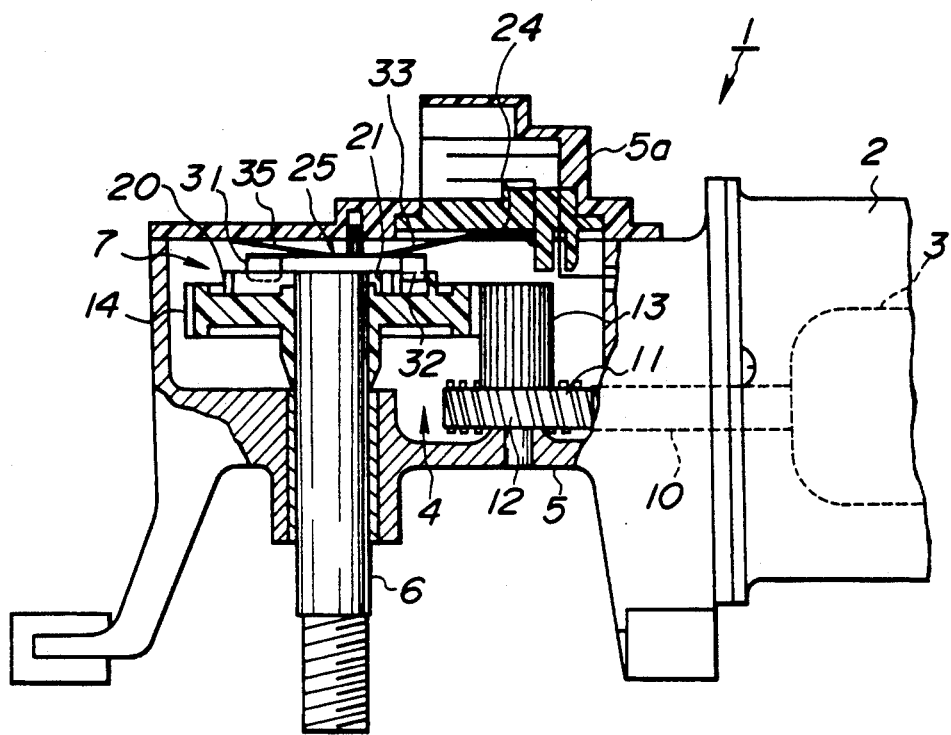
FIG. 2 is a partially sectional view illustrating the embodiment of the windshield wiper motor according to this invention.
Figure 3:
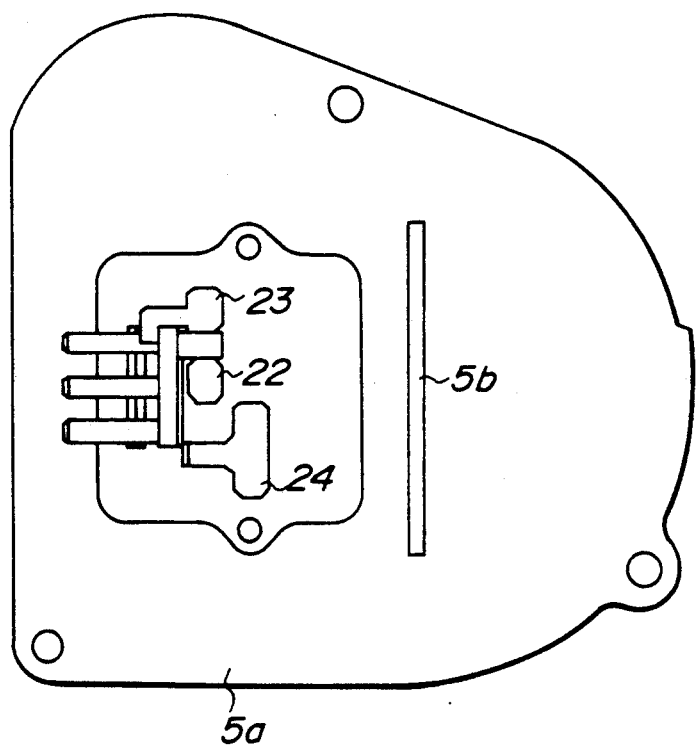
FIG. 3 is a bottom view illustrating the inner surface of the gear cover of the windshield wiper motor shown in FIG. 2.

FIGS. 1 to 7 are diagrams showing an embodiment of the windshield wiper motor according to this invention, FIGS. 1 and 2 are an exploded perspective view and a partially sectional view illustrating the construction of the windshield wiper motor.

Figure 7:
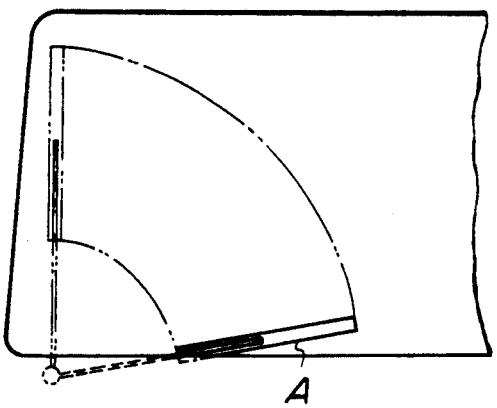
FIG. 7 is a diagram illustrating the stopping position of the wiper blade.
Figure 8:
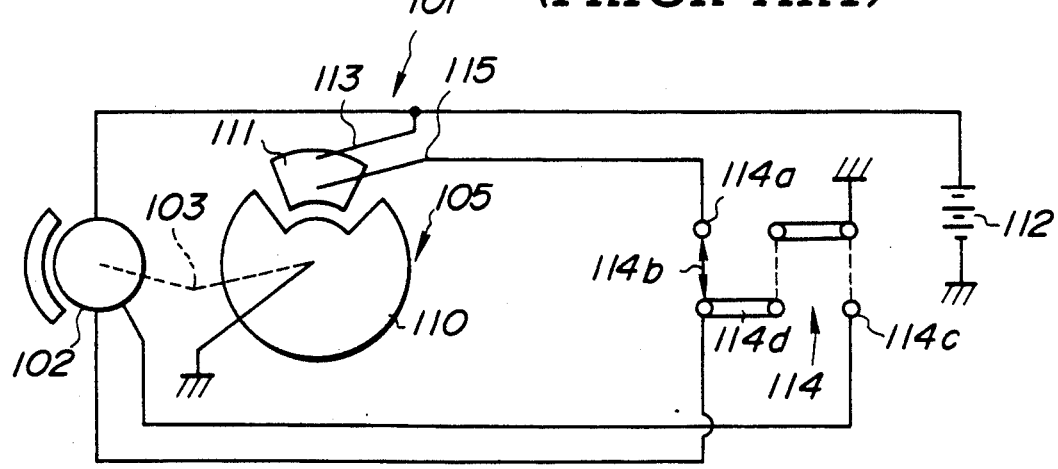
FIG. 8 is a diagram illustrating the circuit formation of the conventional windshield wiper motor.

A windshield wiper motor 1 shown in FIGS. 1 and 2 has a construction comprising an electric motor part 2, a gear case 5 connected with said motor part 2 and housing reduction gear 4 for reducing rotational speed of an armature 3 of said motor part 2, and an auto-stopping switch 7 provided to said reduction gear 4 and for driving a wiper blade A shown in FIG. 7 and connected to an output shaft 6 of the reduction gear 4 through a wiper linkage to a fixed stopping position and stopping said wiper blade A at said stopping position by dynamic braking according to OFF-operation of a wiper switch (not shown).

Said reduction gear 4 has a construction comprising a worm 11 formed on a tip end of an armature shaft 10 by rolling, a worm wheel 12 engaged with said worm 11, an intermediate gear 13 formed in one body with said worm wheel 12 coaxially and the final gear 14 connected with said output shaft 6 coaxially and engaged with said intermediate gear 13.

Said auto-stopping switch 7 has a construction comprising a C-like shaped first projection disposed on the upper surface of the final gear 14 of the reduction gear 4, a second projection 21 disposed on the inner side of said first projection 20, a first contact plate 22 diposed on the inner surface of a gear cover 5a and connected to a grounding conductor, a second contact plate 23 disposed in parallel to said first contact plate 22 with a space and connected to the positive terminal of a power source, long-shaped third contact plate 24 shifted from said first contact plate 22 to be switched over into positive or negative polarity by said contact plates 22 and 23, and a contact shoe 25 made of electrically conductive material and for contacting always with said third contact plate 24 and contacting selectively with said first or second contact plate 22 or 23 by sliding reciprocatively on a straight line in contact with said first and second projections 20 and 21 from the circumferential direction.

Figure 4:
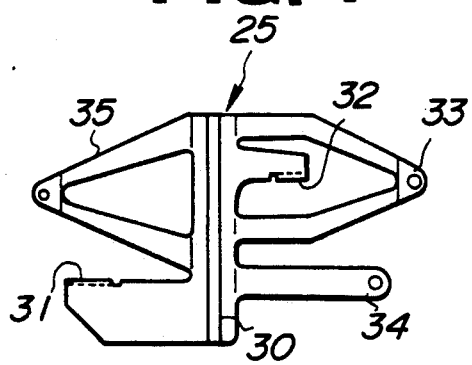
FIGS. 4 and 5 are a front view and a bottom view illustrating the contact shoe, respectively.
Figure 5:
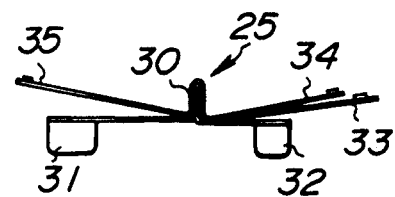

Said contact shoe 25 has a construction comprising, as shown also in FIGS. 4 and 5, a guide 30 for sliding reciprocatively on the straight line by engaging with a guide groove 5b provided on the inner surface of said gear cover 5a, a first protrusion 31 formed in bent downwardly in FIG. 5 for sliding said contact shoe 25 into predetermined direction on the guide groove 5b in contact with said first projection 20, a second projection 32 formed in bent downwardly in FIG. 5 for sliding said contact shoe 25 into another side on the guide groove 5b in contact with said second projection 21, a first contact 33 for contacting with said first or second contact plates 22 or 23 selectively by the reciprocative slide on the straight line of said contact shoe 25 through said first and second protrusions 31 and 32, a second contact 34 for contacting with said third contact plate 24 at all times, and a third contact 35 in contact with the inner surface of the gear cover 5a together with said first contact 33 for energizing said contact shoe 25 downwardly in FIG. 2. Furthermore, pin-like rivets 33a and 34a are attached to the tip ends of said first and second contacts 33 and 34 in order to facilitate the contacting with respective contact plates 22, 23 and 24.

Next, the action of the auto-stopping switch 7 of the windshield wiper motor 1 will be explained according to FIG. 6.

Figure 6A:
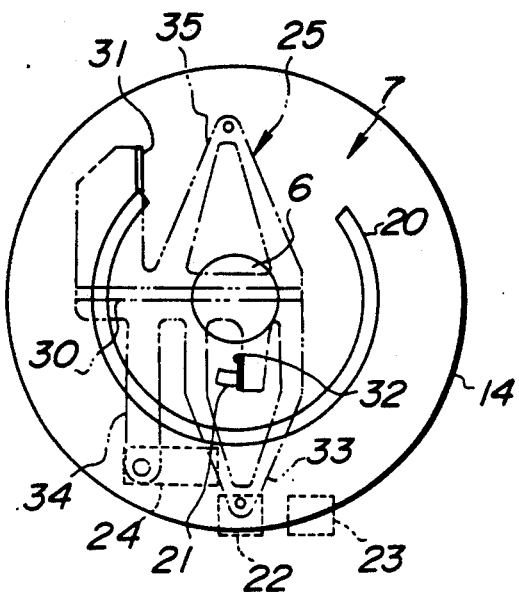
FIGS. 6(a) to 6(p) are operational diagrams of the auto-stopping switch shown in FIG. 1.
Figure 6B:
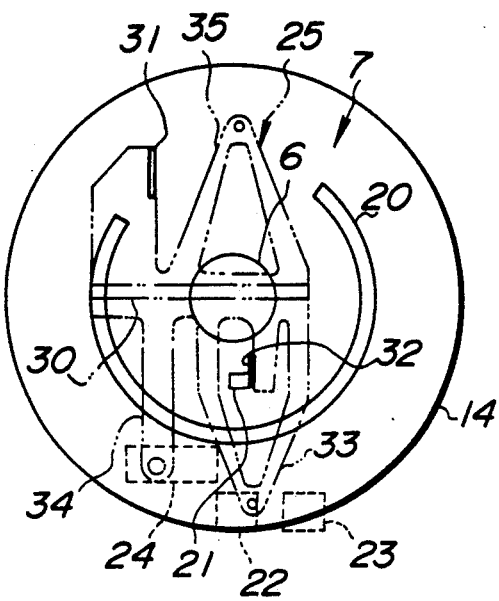
Figure 6C:
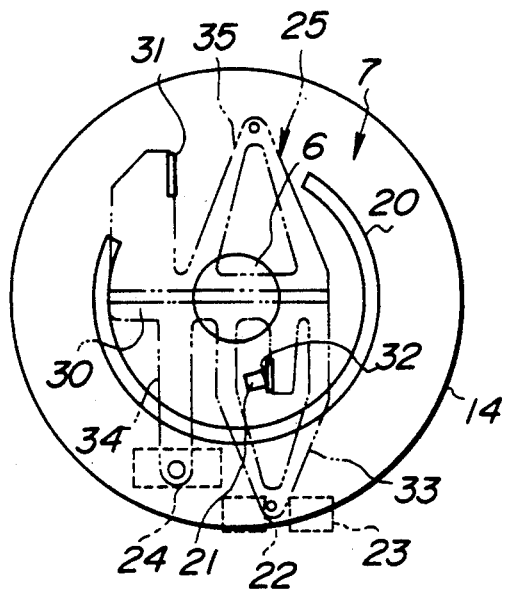
Figure 6D:
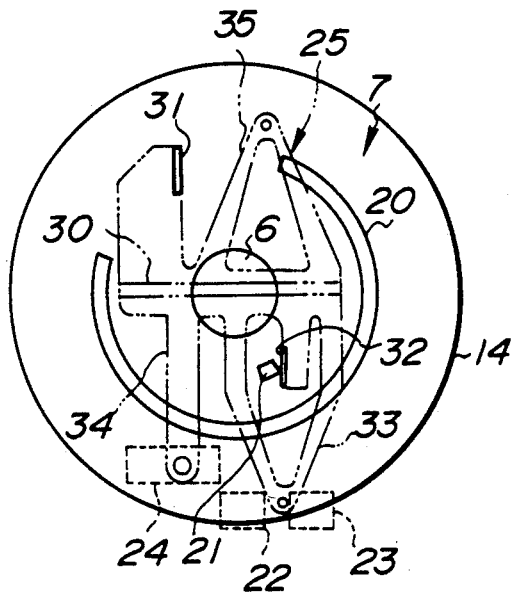

As shown in FIG. 6(a), when the second projection 21 is in contact with the second projection 32 of the contact shoe 25 according to the anticlockwise rotation of the final gear 14, the contact shoe 25 is slided rightwardly in the figures, as shown in FIG. 6(b) to FIG. 6(f), by the guide 30 of the contact shoe 25 engaged with the guide groove 5b of the gear cover 5a. In this time, the first contact 33 of the contact shoe 25 comes in touch with the second contact plate 23 by leaving from the first contact plate 22. Therefore, in case the wiper switch is operated into OFF-state, the armature 3 is braked dynamically and the wiper blade A is stopped at the fixed stopping position shown with the solid line in FIG. 7.

After then, when the final gear 14 further rotates in the anticlockwise direction, the guide 30 of the contact shoe 25 comes in touch with the right side end of the guide groove 5b of the gear cover 5a and said contact shoe 25 becomes not to slide rightwardly in the figures. And as shown in FIG. 6(g), the second projection 21 moves in the anticlockwise direction as avoiding the second protrusion 32 of the contact shoe 25 upwardly in the figure, at the same time, the first projection 20 begins to contact with the first protrusion 31 of the contact shoe 25 in the anticlockwise direction.

Figure 6E:
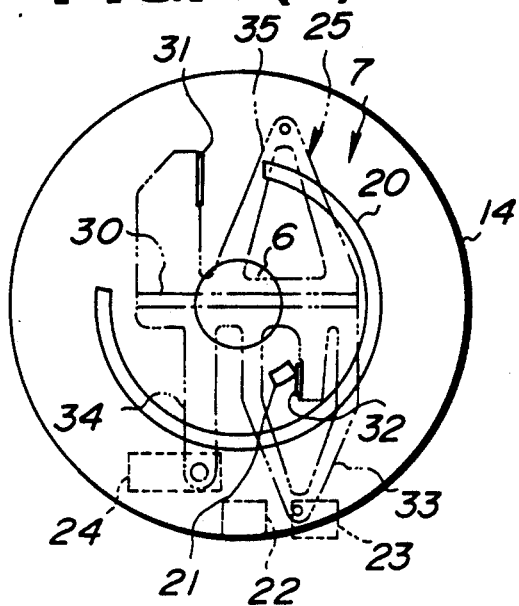
Figure 6F:
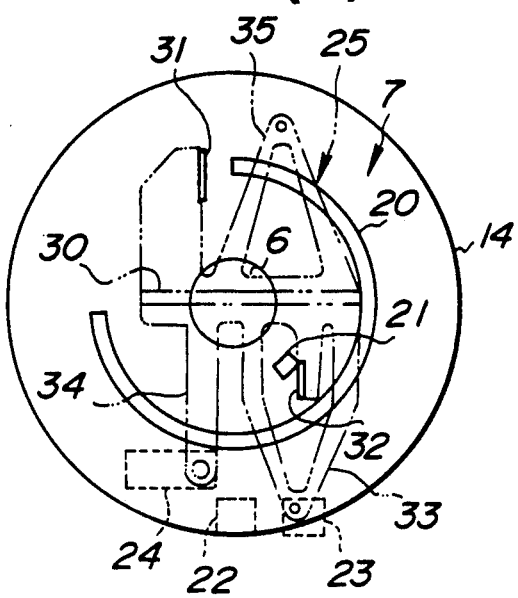
Figure 6G:
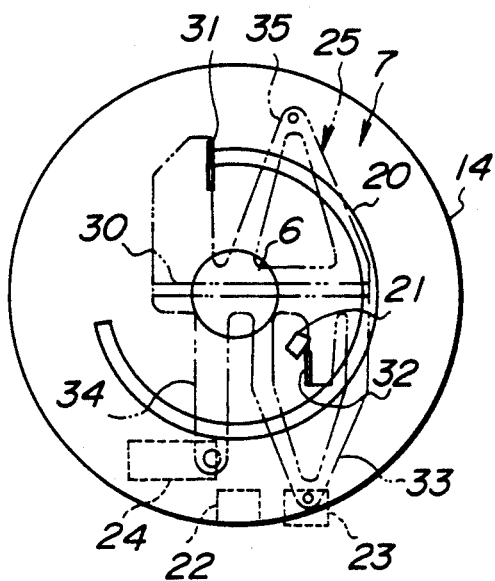
Figure 6H:
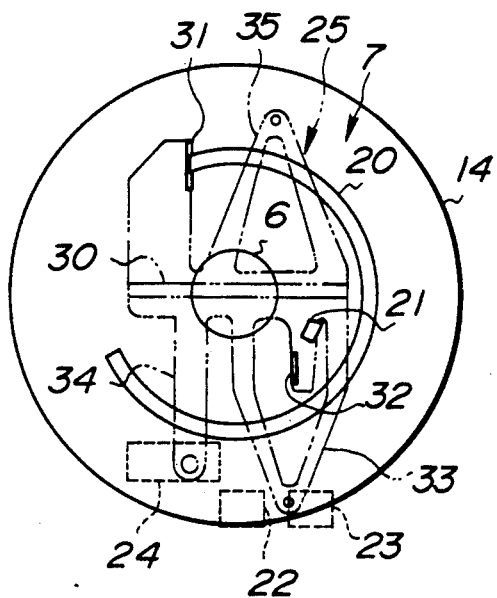
Figure 6I:
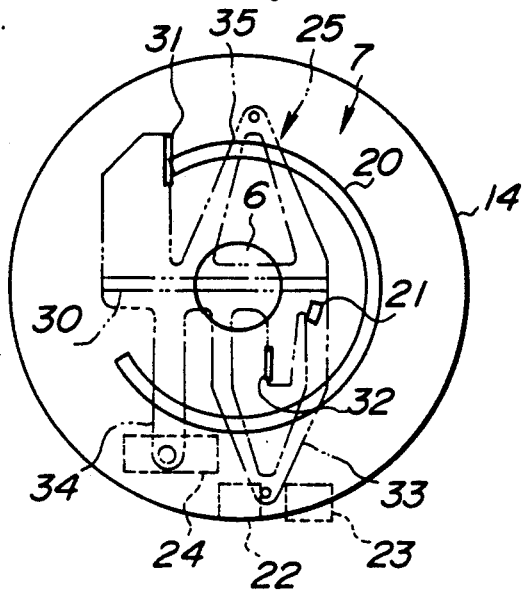
Figure 6J:
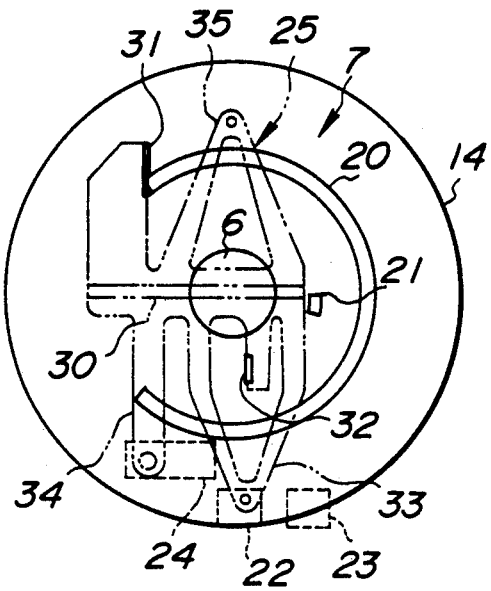
Figure 6K:
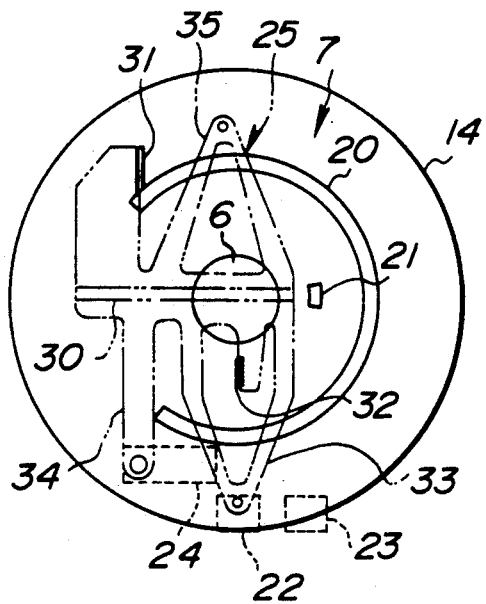
Figure 6L:
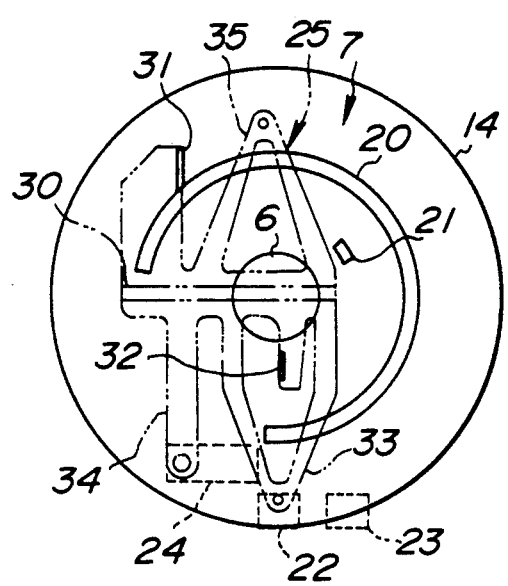
Figure 6M:
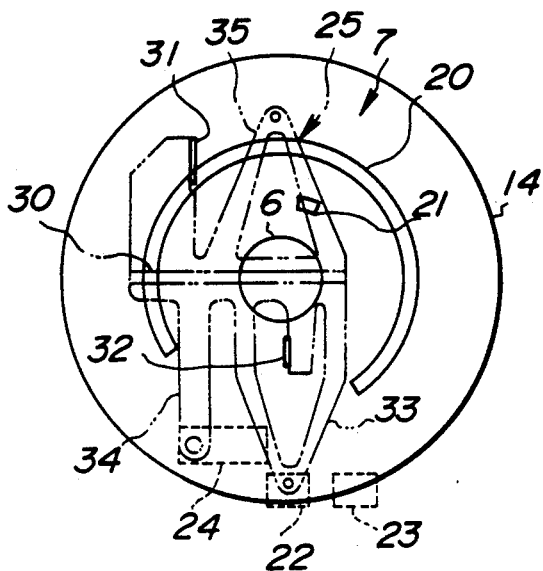
Figure 6N:
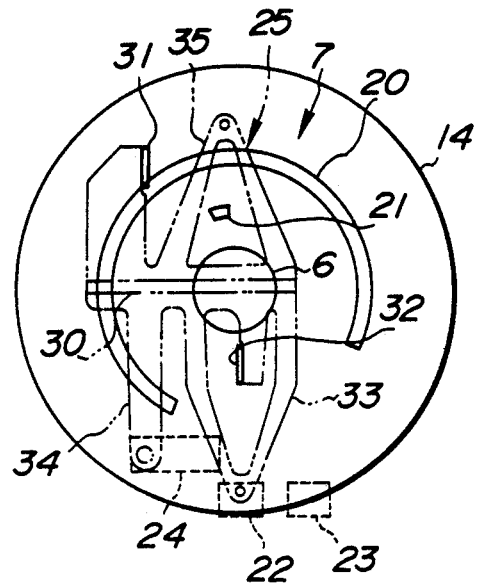
Figure 6O:
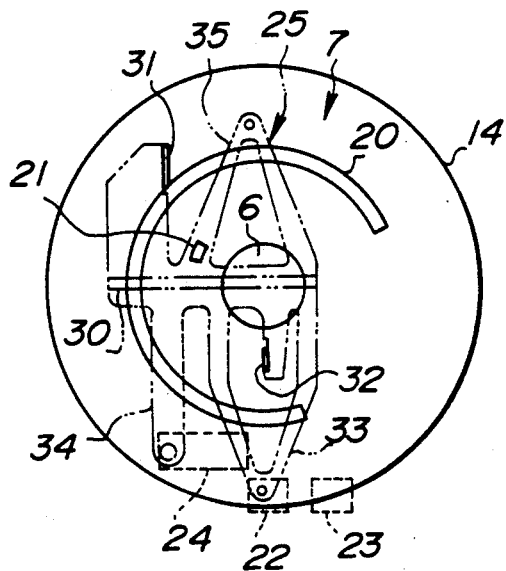
Figure 6P:
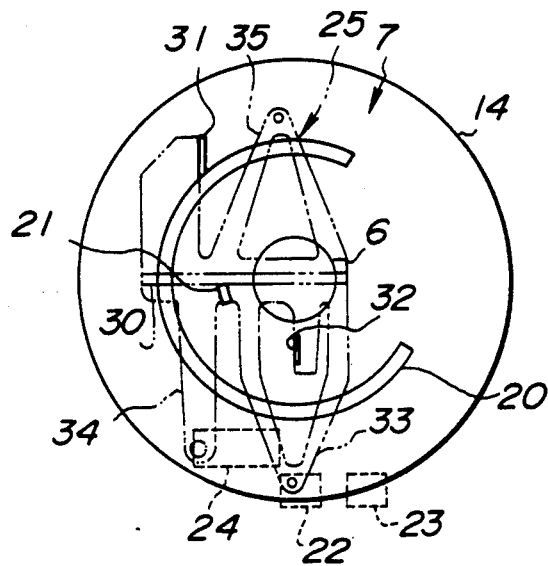

Thereby, as shown in FIG. 6(h) to FIG. 6(j), the contact shoe 25 is slided into the left side in the figures according to the anticlockwise rotation of the final gear 14 by the contact of the first protrusion 31 with the first projection 20, and the first contact 33 of the contact shoe 25 comes in touch with the first contact plate 22 by leaving from the second contact plate 23. Operating the wiper switch into OFF-state in this state, the power supply to the armature 3 is continued until the auto-stopping switch 7 reached to the state shown in FIG. 6(c).

When the final gear 14 rotates further in the anticlockwise direction in the aforementioned state, the guide 30 of the contact shoe 25 comes in touch with the left side end of the guide groove 5b of the gear cover 5a, and the first projection 20 moves as avoiding the first protrusion 31 of the contact shoe 25 downwardly in the figures as shown in FIG. 6(k) to FIG. 6(p), and the contact shoe 25 remaines in this state until the auto-stopping switch 7 reaches to the state shown in FIG. 6(a).

And in the aforementioned state shown in FIG. 6(e) to FIG. 6(g), the contact shoe 25 is possible to be maintained in the position as it is even if the wiper blade A is returned in the opposite direction as a reaction from the snow gathered in the vicinity of the stopping position by the hitting of said wiper blade A against the snow in snowfall, that is, even if the output shaft rotates in the clockwise direction.

Accordingly, when the wiper blade A is not in the stopping position, the power supply to the armature 3 is continued by the auto-stopping switch 7 until the wiper blade A reaches to the stopping position in the case the OFF-operation of the wiper switch is done, and when the wiper blade A reaches to the fixed stopping position, the auto-stopping switch 7 brakes the armature 3 dynamically and the wiper blade A is stopped similarly to the auto-stopping switch of the conventional windshield wiper motor. Hereupon, the problem such as chattering never arises differing from the conventional windshield wiper motor because the reverse rotation of the final gear 14 is not transmitted to the contact sheo 25 even if the output shaft 6 rotates in the opposite direction.

And in said auto-stopping switch 7, because the power supplying time to the armature 30 depends on the circumferential length of the first projection 20 and the timing of the dynamic braking for the armature 3 depends on the position and the circumferential length of the second projection 21, it is possible to control the power supplying time to the armature 3 and the timing of the dynamic braking at will by the adjustment of the first projection 20 and the second projection 21.

As mentioned above, the windshield wiper motor according to claim 1 of this invention comprises an electric motor part, a gear case connected with said motor part and housing reduction gear for reducing rotational speed of an armature of said motor part and an auto-stopping switch provided to said gear case and for driving an output shaft of said reduction gear to a fixed stopping position and stopping the armature of said motor part at said stopping position by dynamic braking according to OFF-operation of a wiper switch, said auto-stopping switch is provided with a first contact plate connected to a grounded conductor, a second contact plate connected to a power source and a third contact plate connected to a line terminal of the motor part on the inner surface of a gear cover, and provided with a contact shoe in contact with said third contact plate at all times and in contact with said first or second contact plate selectively by sliding on a straight line reciprocatively in accordance with rotation of the final gear of said reduction gear. Therefore, it is possible to stop the wiper blade at the fixed stopping position at the time of OFF-operation of the wiper switch by sliding reciprocatively the contact shoe of the auto-stopping switch on the straight line according to the rotation of the final gear. And excellent effects can be obtained in that it is possible to improve the reliability by reducing the number of the parts as compared with the conventional auto-stopping switch and possible to make the correction after the assembly unnecessary because the power supply to the armature is switched on or off by the contact shoe of the auto-stopping switch.

And the windshield wiper motor according to claim 2 of this invention has the contact shoe provided with a first protrusion for sliding said contact shoe into predetermined direction on a guide groove in contact with a C-like shaped first projection disposed on the final gear of said reduction gear, a second protrusion for sliding said contact shoe into another side on the guide groove in contact with a second projection disposed on the inner side of said first projection, a first contact for contacting selectively with the first or second contact plate, and a second contact for contacting with the third contact plate at all times in the windshield wiper motor according to claim 1. Therefore, the contact shoe of the auto-stopping switch stays at the position as it is even if the wiper blade is returned as a reaction from snow gathered in the vicinity of the stopping position of the wiper blade in snowfall, because the contact shoe is slided into one side on the guide groove by contacting the first protrusion of the contact shoe with the C-like shaped first projection and slided into another side on the guide groove by contacting the second protrusion of contact shoe with the second projection. Accordingly, an excellent effect can be obtained since it is possible to prevent the chattering caused by the reverse rotation of the final gear in addition to the effect of the invention claimed in claim 1.

We claim:
1. A windshield wiper motor comprising:
   an electric motor part;
   a gear case connected with said motor part and housing reduction gear for reducing rotational speed of an armature of said motor part; and
   an auto-stopping switch provided to said gear case and for driving an output shaft of said reduction gear to a fixed stopping position and stopping the armature of said motor part at said stopping posi- tion by dynamic braking according to OFF-operation of a wiper switch;

said auto-stopping switch being provided with a first contact plate connected to a grounding conductor, a second contact plate connected to a power source and a third contact plate connected to a line terminal of the motor part on the inner surface of a gear cover, and provided with a contact shoe for contacting with said third contact plate at all times and for contacting with said first or second contact plate selectively by sliding on a straight line reciprocatively in accordance with rotation of the final gear of said reduction gear.

2. A windshield wiper motor as set forth in claim 1, wherein said contact shoe is provided with a first protrusion for sliding said contact shoe into predetermined direction on a guide groove in contact with a C-like shaped first projection disposed on the final gear of said reduction gear, a second protrusion for sliding said contact shoe into another side on the guide groove in contact with a second projection disposed on the inner side of said first projection, a first contact for contacting selectively with the first or second contact plate, and a second contact for contacting with the third contact plate at all times.

* * * * *